US009654237B2

(12) United States Patent
Keener et al.

(10) Patent No.: US 9,654,237 B2
(45) Date of Patent: May 16, 2017

(54) BROADCAST METHOD AND SYSTEM

(75) Inventors: David J. Keener, Tulsa, OK (US); John S. Jones, Tulsa, OK (US); Peter L. Ward, Tulsa, OK (US)

(73) Assignee: Level 3 Communications, LLC, Broomfield, CO (US)

( * ) Notice: Subject to any disclaimer, the term of this patent is extended or adjusted under 35 U.S.C. 154(b) by 827 days.

(21) Appl. No.: 13/205,541

(22) Filed: Aug. 8, 2011

(65) Prior Publication Data
US 2011/0292281 A1 Dec. 1, 2011

Related U.S. Application Data

(63) Continuation of application No. 11/591,819, filed on Nov. 1, 2006, now Pat. No. 7,995,151.

(51) Int. Cl.
*H04N 5/44* (2011.01)
*H04H 60/05* (2008.01)
(Continued)

(52) U.S. Cl.
CPC ............ *H04H 60/05* (2013.01); *H04H 60/07* (2013.01); *H04N 5/222* (2013.01); *H04N 5/268* (2013.01); *H04N 5/28* (2013.01)

(58) Field of Classification Search
CPC .......... H04N 5/44; H04N 5/222; H04N 5/268; H04N 5/28; H04H 60/05; H04H 60/07
(Continued)

(56) References Cited

U.S. PATENT DOCUMENTS 5,345,594 A 9/1994 Tsuda
5,600,573 A 2/1997 Hendricks et al.
(Continued)

FOREIGN PATENT DOCUMENTS

EP 0 488 673 A2 * 11/1991
EP 0488673 A2 6/1992
(Continued)

OTHER PUBLICATIONS

"Extended European Search Report, dated Jan. 31, 2012", EP Application No. 07863508.3, 8 pgs.
(Continued)

Primary Examiner — Trang U Tran

(57) ABSTRACT

A method and system for airing broadcast signals is disclosed. Preferably, the system includes a production truck interface panel receiving a broadcast signal. A transmission relay circuit relays the signal from the interface panel to a broadcast network, and preferably including a broadcast signal detection circuit, and a signal processing circuit. The detection circuit determines a signal type of the broadcast signal, and the signal processing circuit processes the determined signal type. The system preferably further includes an operations control station displaying the determined type of broadcast signal. The method for airing broadcast signals over the broadcast network preferably includes the steps of providing the broadcast signal to the transmission relay circuit, detecting the broadcast signal type with the broadcast signal sensing and discerning circuit; and reconfiguring the signal processing circuit when the configuration of the signal processing circuit does not support transmission of the determined broadcast signal type.

20 Claims, 9 Drawing Sheets

(51) Int. Cl.
*H04H 60/07* (2008.01)
*H04N 5/222* (2006.01)
*H04N 5/268* (2006.01)
*H04N 5/28* (2006.01)

(58) Field of Classification Search
USPC ....... 348/578, 723, 725, 722, 473, 579, 580, 348/157, 169, 554–555, 705–706, 558; 725/36, 67, 70, 146, 148, 118–120, 725/126–127, 131, 139
See application file for complete search history.

(56) References Cited

U.S. PATENT DOCUMENTS

| | | | |
|---|---|---|---|
| 5,649,318 | A | 7/1997 | Lusignan |
| 5,659,353 | A | 8/1997 | Kostreski et al. |
| 5,917,553 | A | 6/1999 | Honey et al. |
| 6,266,813 | B1 | 7/2001 | Ihara |
| 6,587,154 | B1 | 7/2003 | Anderson et al. |
| 6,850,250 | B2 | 2/2005 | Hoch |
| 6,870,886 | B2 | 3/2005 | Challapali et al. |
| 6,904,095 | B1 | 6/2005 | Wilkinson et al. |
| 6,907,881 | B2 | 6/2005 | Suki et al. |
| 6,965,601 | B1 | 11/2005 | Nakano et al. |
| 7,012,964 | B1 | 3/2006 | Nakano et al. |
| 7,046,299 | B1 | 5/2006 | Lowe |
| 7,131,045 | B2 | 10/2006 | Guettaf |
| 7,131,135 | B1 | 10/2006 | Virag et al. |
| 7,256,840 | B2 | 8/2007 | Barreyro et al. |
| 7,298,424 | B2 | 11/2007 | Oh |
| 7,453,520 | B2 | 11/2008 | Kim |
| 7,690,022 | B2 | 3/2010 | Basawapatna et al. |
| 7,728,911 | B2 | 6/2010 | Lacy et al. |
| 7,995,151 | B2 * | 8/2011 | Keener et al. ............... 348/723 |
| 8,009,236 | B2 | 8/2011 | Keener et al. |
| 2001/0026319 | A1 | 10/2001 | Honey et al. |
| 2002/0059651 | A1 | 5/2002 | Hirata et al. |
| 2002/0178454 | A1 | 11/2002 | Antoine et al. |
| 2003/0142129 | A1 | 7/2003 | Kleven et al. |
| 2003/0206242 | A1 | 11/2003 | Choi |
| 2004/0066792 | A1 | 4/2004 | Okabayashi |
| 2004/0151468 | A1 | 8/2004 | Gim |
| 2004/0161031 | A1 | 8/2004 | Kwentus et al. |
| 2005/0076134 | A1 | 4/2005 | Bialik et al. |
| 2005/0169314 | A1 | 8/2005 | Beaudoin et al. |
| 2005/0212920 | A1 | 9/2005 | Evans et al. |
| 2006/0130107 | A1 | 6/2006 | Gonder et al. |
| 2006/0164546 | A1 | 7/2006 | Adachi |
| 2010/0312861 | A1 | 12/2010 | Kolhi et al. |
| 2011/0310251 | A1 | 12/2011 | Keener |

FOREIGN PATENT DOCUMENTS

| | | |
|---|---|---|
| EP | 1635565 A2 | 3/2006 |
| JP | 2006203738 | 8/2006 |
| WO | WO-2004008738 A1 | 1/2004 |
| WO | WO-2007/082515 A1 | 7/2007 |

OTHER PUBLICATIONS

International Search Report dated Apr. 8, 2008, PCT/US2007/82515, filed Oct. 25, 2007, 3 pgs.
"International Search Report and Written Opinion of the ISA", PCT/US2007/82517, filed Oct. 25, 2007, Feb. 28, 2008, 10 pgs.
"European Office Action dated Dec. 20, 2011", EP Appl. No. 07863510.9, 8 pgs.
"Extended European Search Report dated Nov. 2, 2010,", counterpart App. No. 07863510.9, filed Oct. 25, 2007, 6 pgs.
"International Search Report and Written Opinion dated Apr. 8, 2008", PCT/US07/82517, filed Oct. 25, 2007, 3 pgs.
Canada Examination Report, dated Jul. 16, 2013, Application No. 2,668,191, 4 pgs.
Canada Examination Report, dated Jul. 3, 2013, Application No. 2,668,427, 3 pgs.
European Examination Report, dated Apr. 8, 2013, Application No. 07863508.3, 9 pgs.
Summons to Attend Oral Proceedings, dated Oct. 15, 2013, Application No. EP07863508.3, filed Oct. 25, 2007, 10 pgs.
Summons to Attend Oral Proceedings, dated Nov. 5, 2013, European Appl. No. 07863510.9, filed Oct. 25, 2007, 10 pgs.
Canadian Examination Report, dated Aug. 11, 2015, Application No. 2,668,191, filed Oct. 25, 2007; 4 pgs.
Canadian Examination Report, dated Jul. 29, 2014, Aoplication No. 2,668,191, filed Oct. 25, 2007; 3 pgs.
Decision to Refuse a European Patent Application, dated Jun. 3, 2014, Application No. 07863510.9, filed Oct. 25, 2007; 19 pgs.
Decision to Refuse a European Patent Application, dated Jun. 6, 2014, Application No. 07863508.3, filed Oct. 25, 2007; 19 pgs.
Canadian Examination Report, dated Oct. 6, 2016, Application No. 2,668,191, filed Oct. 25, 2007; 2 pgs.

* cited by examiner

BROADCAST METHOD AND SYSTEM

CROSS-REFERENCE TO RELATED APPLICATIONS

This application is a continuation of and claims benefit of priority to U.S. Non-Provisional patent application Ser. No. 11/591,819 now U.S. Pat. No. 7,995,151, entitled "Broadcast Method and System," filed Nov. 1, 2006, which is incorporated herein by reference for all purposes.

FIELD OF THE INVENTION

The claimed invention relates generally to the field of signal processing and transmission and more particularly, but not by way of limitation, to a system and associated method for processing, distributing, and broadcasting television signals.

BACKGROUND

Systems and methods for televising events, such as live sporting events, are known and have been in place for at least a half century, and for nearly all of that time analog video signal generation and processing equipment was not only the preferred approach to television broadcasting, it was the only approach to television broadcasting.

Within the North American broadcast market, NTSC analog video signals had been the standard for the broadcast industry since 1940 when the Federal Communications Commission adopted the standard, however more recently a number of alternate digital signaling technologies have come into use and have changed the dynamics of how events are broadcast. Those signaling technologies currently include ASI digital video signals, DS-3 digital video transport signals, SDI digital video transport signals, and HD-SDI digital video transport signals.

The multiplicity of signal types, combined with the use of a backbones of information networks for high speed, and world wide deployment of event broadcasts have created difficulties in assuring proper configuration of equipment is present and fully operative throughout the operative broadcast network. Accordingly, as market pressures continue to demand higher quality, live, reliable broadcasts (available worldwide), challenges remain and a need persists for improvements in methods and apparatuses for use in broadcast processing and distribution.

SUMMARY OF THE INVENTION

In accordance with preferred embodiments, a method for airing a broadcast signal over a broadcast network preferably includes the steps of, providing a broadcast signal to a transmission relay circuit, determining the broadcast signal type with a broadcast signal sensing and discerning circuit, and reconfiguring a signal processing circuit of the transmission relay circuit when the configuration of the signal processing circuit does not support transmission of the determined broadcast signal type as provided. The type of broadcast signal determined is selected from a group consisting of preferably (NTSC, DS-3, ASI, SDI, and HD-SDI video signals).

The preferred method further includes signaling the type of broadcast signal determined, identifying a pair of connectors of the signal processing circuit servicing the type of broadcast signal determined, and plugging a jumper cable into the pair of signal processing circuit connectors. Alternatively, the preferred method further includes transmitting a signal to an operations control station signifying the type of broadcast signal determined, displaying the type of broadcast signal determined on a graphical user interface of the operations control station based on the transmitted signal, activating a relay symbol provided by the graphical user interface.

Upon activation of the relay symbol, the operations control station preferably generates a relay activation command based on activation of the relay symbol, transmits the relay activation command to the demarcation/equipment cabinet, and switching a relay of the signal processing circuit to configure the signal processing circuit to support processing of the determined broadcast signal type.

In an alternative preferred embodiment, a method of operating the controller in an indirect operating mode preferably includes the steps of: generating the provided broadcast signal with a broadcast signal generation circuit of the transmission relay circuit, injecting the generated broadcast signal into the signal processing circuit, passing the generated broadcast signal from the signal processing circuit to a production truck interface panel communicating with the broadcast signal generation circuit, looping the generated broadcast signal from the production truck interface panel to the transmission relay circuit, and confirming signal path continuity between the transmission relay circuit and the production truck interface panel.

In accordance with alternate preferred embodiments a system for airing broadcast signals over a broadcast network preferably includes a production truck interface panel receiving a broadcast signal from a broadcast signal provider, a transmission relay circuit of a demarcation/equipment cabinet receiving the broadcast signal, and an operations control station communicating with the transmission relay circuit for displaying the type of broadcast signal determined by the broadcast signal sensing and discerning circuit. The transmission relay circuit preferably provides a broadcast signal sensing and discerning circuit, and a signal processing circuit. The broadcast signal detection circuit is preferably configured for determining a signal type of the broadcast signal, and the signal processing circuit is preferably configured for processing the determined signal type. The type of broadcast signal determined is preferably selected from a group consisting of (NTSC, DS-3, ASI, SDI, and HD-SDI video signals).

Preferably the broadcast signal airing system further includes television signal receiving and transmission equipment communicating with the transmission relay circuit for advancing the broadcast signal along the broadcast network. The production truck interface panel preferably includes a signal transport circuit communicating with the transmission relay circuit, a microcontroller communicating with the operations control station, a test signal generator responsive to the microcontroller generating a test signal, and a switching circuit responsive to commands from the operations control station for switching the generated test signal into an out of the signal transport circuit.

In a preferred embodiment the operations control station preferably includes at least a microprocessor communicating with the transmission relay circuit, configuration control software loaded on the microprocessor, a display responsive to the microprocessor, and a graphical user interface provided by the configuration control software and displayed on the display, wherein upon activation by a user of a relay symbol provided by the graphical user interface a command is issued by the microprocessor, transferred to the transmission relay circuit and a relay of the signal processing circuit is switched to configure the signal processing circuit for processing the type of broadcast signal determined by the signal detection circuit.

These and various other features and advantages that characterize the claimed invention will be apparent upon reading the following detailed description and upon review of the associated drawings.

DESCRIPTION OF THE PREFERRED EMBODIMENTS

Reference will now be made in detail to one or more examples of the invention depicted in the figures. Each example is provided by way of explanation of the invention, and not meant as a limitation of the invention. For example, features illustrated or described as part of one embodiment may be used with another embodiment to yield still a different embodiment. Other modifications and variations to the described embodiments are also contemplated within the scope and spirit of the invention.

Figure 1:
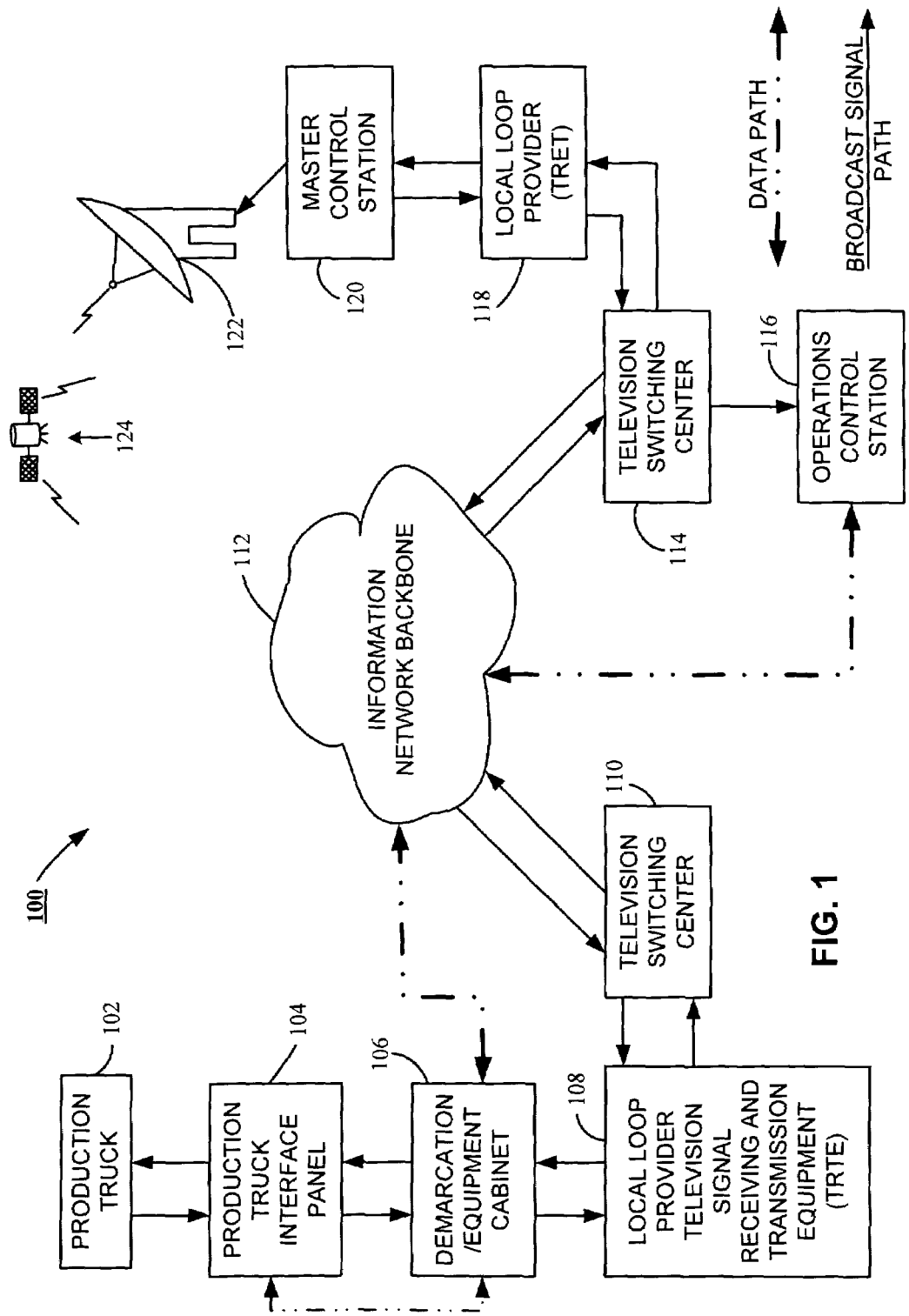
FIG. 1 shows a functional block diagram of a system for airing a broadcast signal over a broadcast network.

Referring to the drawings, FIG. 1 shows an inventive broadcast network 100 for airing a broadcast signal generated by a broadcast signal provider, such as ESPN, FOX, CBS, NBC, and ABC. The broadcast network 100 preferably includes a production truck 102, which receives multiple signals from television cameras recording events such as football games, baseball games, hockey games, and other events of interest. Personnel within the production truck 102 make decisions on a continuing basis to determine, which camera shots will be passed on for broadcast.

On a real-time basis, the personnel within the production truck pass selected camera shots in the form of a single broadcast signal and four audio signals, or a broadcast signal with embedded audio to a production truck interface panel 104. The production truck interface panel 104 provides a multitude of channels for receipt of a number of broadcast signals and their accompanying audio signals, and/or a number of broadcast signals with embedded audio. The production truck interface panel 104 also provides broadcast signals along with their accompanying audio, or a broadcast signal with embedded audio to the production truck 102 for their own use, or for use in displaying the transmission on a screen at a sporting event such as a JumboTron in a stadium.

Upon receipt of the broadcast signal from the production truck, the production truck interface panel passes for signal onto a demarcation/equipment cabinet 106. The demarcation/equipment cabinet 106 determines what type of signal is being received from the production truck 102, i.e. whether the signal is a NTSC analog video signal, a DS-3 digital video transport signal, an ASI digital video signal, a SDI digital video transport signal, a HD-SDI digital video transport signal, or other broadcast signal.

Having determined the type of signal being received from the production truck 102, the demarcation/equipment cabinet 106 processes the signal and hands it off to a television signal receiving and transmission equipment of a local loop provider 108, such as COX cable. The local loop provider 108 transports the signal to a television switching center 110, which converts the television signals into telecommunications signals for transport across an information network backbone 112. In a preferred embodiment the information network backbone 112 passes the telecommunications signal to a second television switching center 114.

The second television switching center 114 converts the telecommunications signals received from the information network backbone 112 back into television signals, which it passes to an operations control station 116, and a second local loop provider 118. The second local loop provider 118 passes the television signals onto a master control station 120. The master control station 120 integrates additional information into the television signal, such as commercials, and in a preferred embodiment passes the television signals onto a television broadcast antenna 122 that broadcasts the signal to a satellite transmission station 124, which broadcasts the signal for mass distribution.

The master control station 120 also passes the integrated television signal back through the second local loop provider 118, to the second television switching center 114 and onto the information network backbone 112. The information network backbone 112 has the ability to deliver the integrated television signal worldwide, as well as back to the first television switching center 110, the local loop provider 108, back through the demarcation/equipment cabinet to 106, the production truck interface panel 104, and back to the production truck 102.

Figure 2:
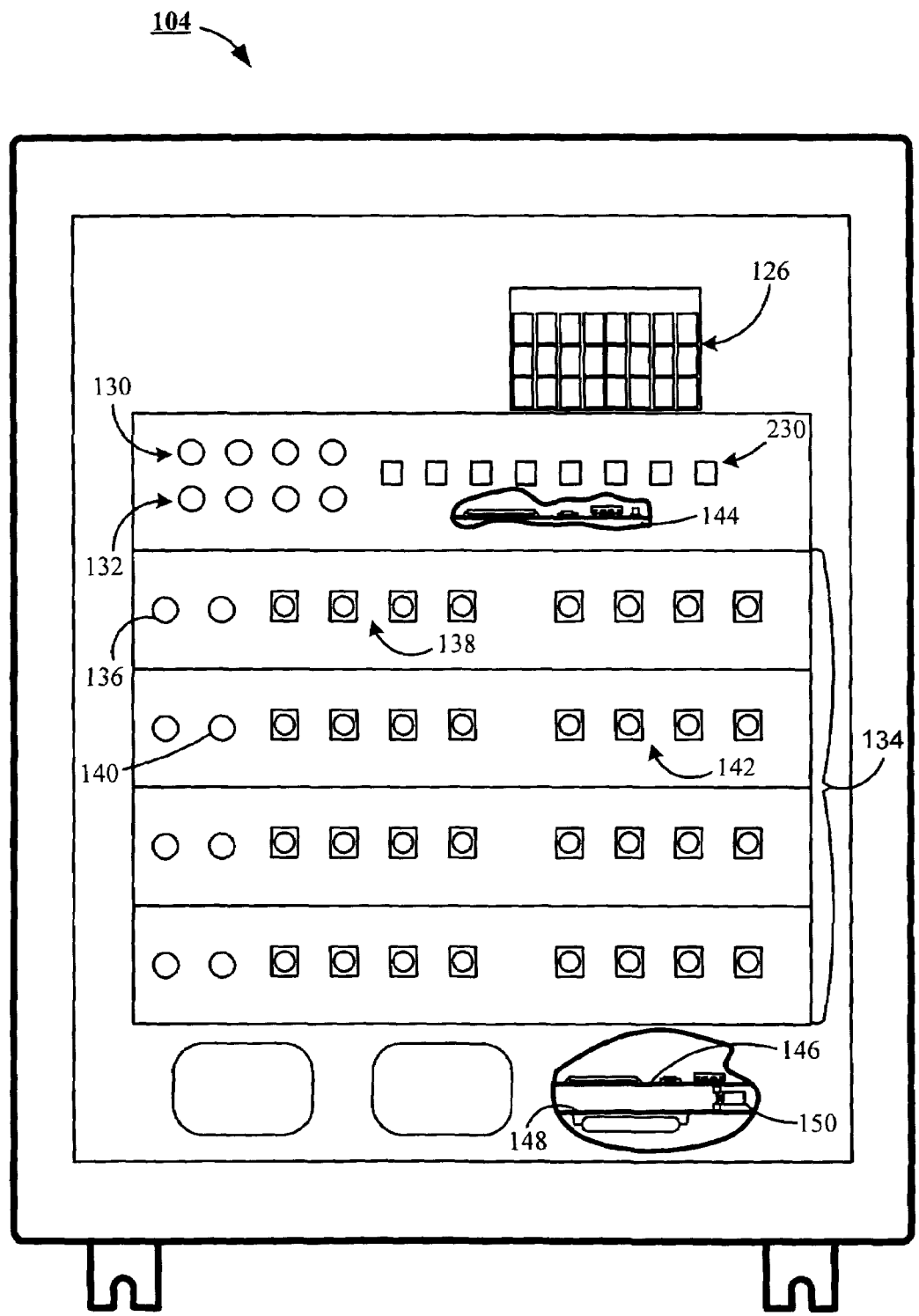
FIG. 2 shows a partial cutaway front elevation view of a production truck interface panel of the present invention.

FIG. 2 shows a preferred embodiment of the production truck interface panel 104, provides a bank of telephone service connections 126, which preferably includes nineteen telephone lines, a T-1 line split into five lines for DSL service, one of which is connected to a modem located within the production truck interface panel 104, which provides eight DSL output ports 128. Adjacent the eight DSL output ports 128, the preferred embodiment provides for digital television signal output channels 130, and four digital television signal input channels 132.

In a preferred embodiment the production truck interface panel 104 further provides four additional service panels 134. Each of the additional service panels 134 provide a video output port 136, with accompanying audio output ports 138 for receiving signals from the production truck 102 (of FIG. 1), and a video input port 140 along with its accompanying audio input ports 142. In a preferred embodiment, both the output port 136 and the input port 140 of each additional service panels 134 can accommodate broadcast signals that include NTSC analog video signals, DS-3 digital video transport signals, ASI digital video signals, SDI digital video transport signals, and HD-SDI digital video transport signals.

FIG. 2 further shows the production truck interface panel 104 preferably provides a signal transport circuit 144 (which preferably conducts the broadcast signal through the production truck interface panel 104, and to the demarcation/ equipment cabinet 106 (of FIG. 1)), a microcontroller 146, a test signal generator 148 (which in a preferred embodiment generates a NTSC analog video signal), and a switching circuit 150 (which in a preferred embodiment is a failsafe relay). Preferably, the test signal generator 148, generates a test signal on an ongoing basis, and when called for a microcontroller 146, activates the switching circuit 150 to inject a test signal into circuitry housed within the demarcation/equipment cabinet 106. The purpose for injecting the test signal into the system is to check for continuity between the production truck interface panel 104 and the electronics housed within the demarcation/equipment cabinet 106.

Figure 3:
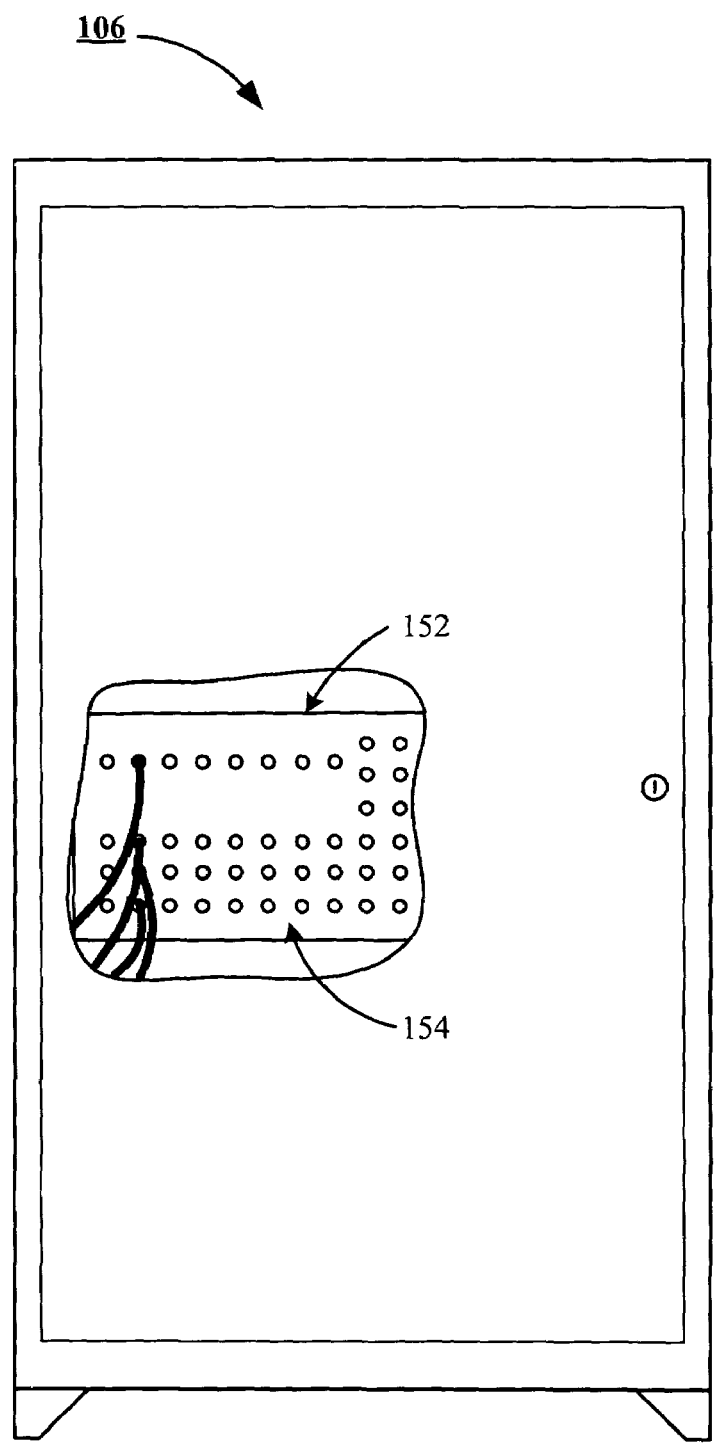
FIG. 3 shows a partial cutaway front elevation view of a demarcation/equipment cabinet of the present invention.

In FIG. 3, the demarcation/equipment cabinet 106 shows a front panel 152 of a transmission relay circuit (not shown separately), preferably includes a plurality of BNC connectors 154, for receiving input signals from the production truck interface panel 104 (of FIG. 2). It is noted that although BNC connectors 154 are shown to be used by the transmission relay circuit, BNC connectors 154 do not impose any limitations on the present invention. The BNC connectors have been selected to enhance an understanding of the present invention by those skilled in the art. Alternate connectors may be used in practicing the invention without deviating from the scope of the invention.

Figure 4:
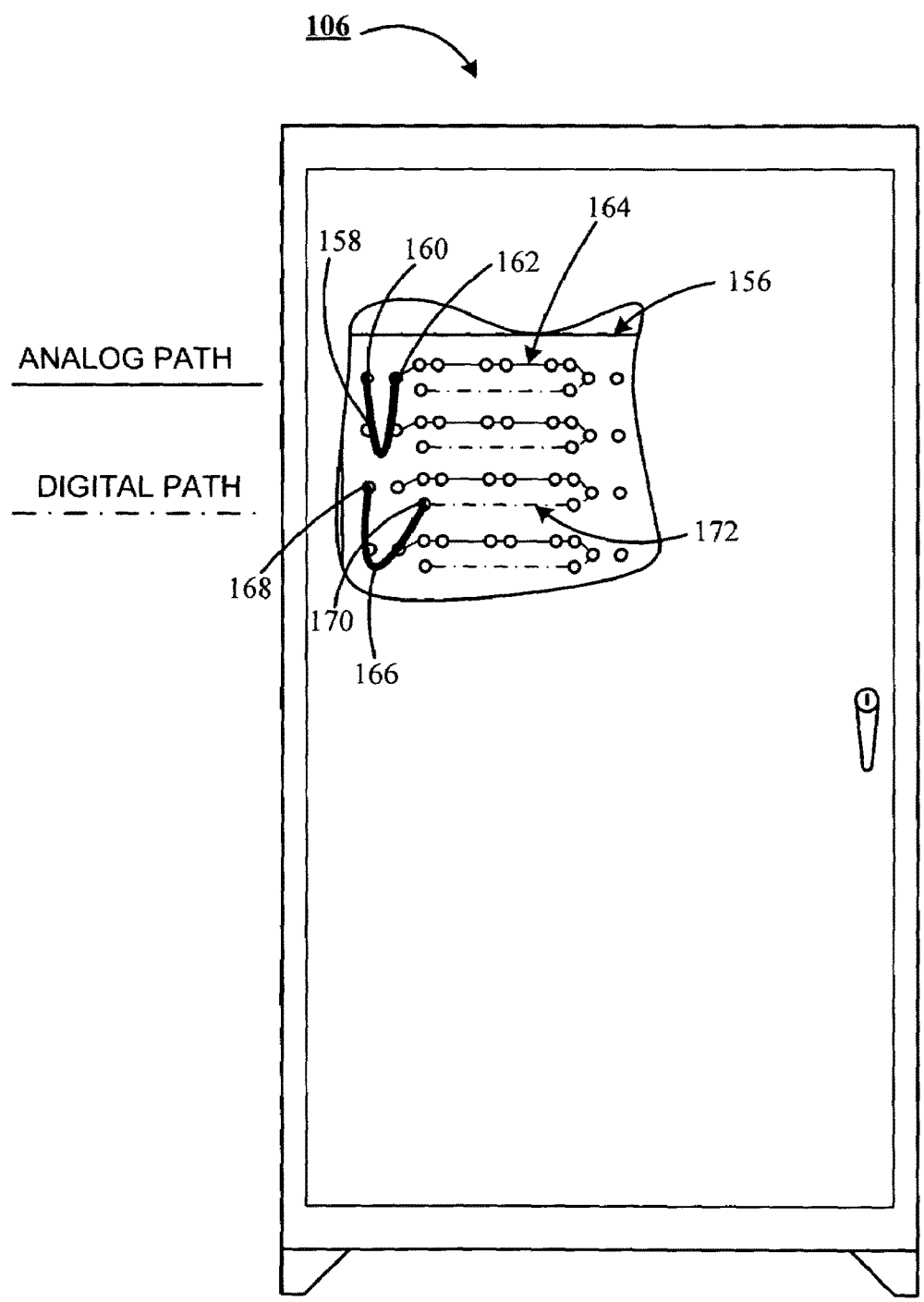
FIG. 4 shows a partial cutaway rear elevation view of a demarcation/equipment cabinet of the present invention.

FIG. 4 shows a back panel 156, of the transmission relay circuit, which preferably provides a graphical representation of the signal paths available for broadcast signals received from the production truck interface panel 104 (of FIG. 2). In a preferred embodiment, if the signal received from the production truck interface panel 104 is an analog video signal, a jumper cable such as 158, is plugged into an input signal connector 160 and jumped across to connector 162 of an analog signal processing path 164. However, if for example the signal received from the production truck interface panel 104 is a digital signal, a jumped cable such as 166, is plugged into an input signal connector 168 and jumper across to connector 170 of a digital processing path 172.

Figure 5:
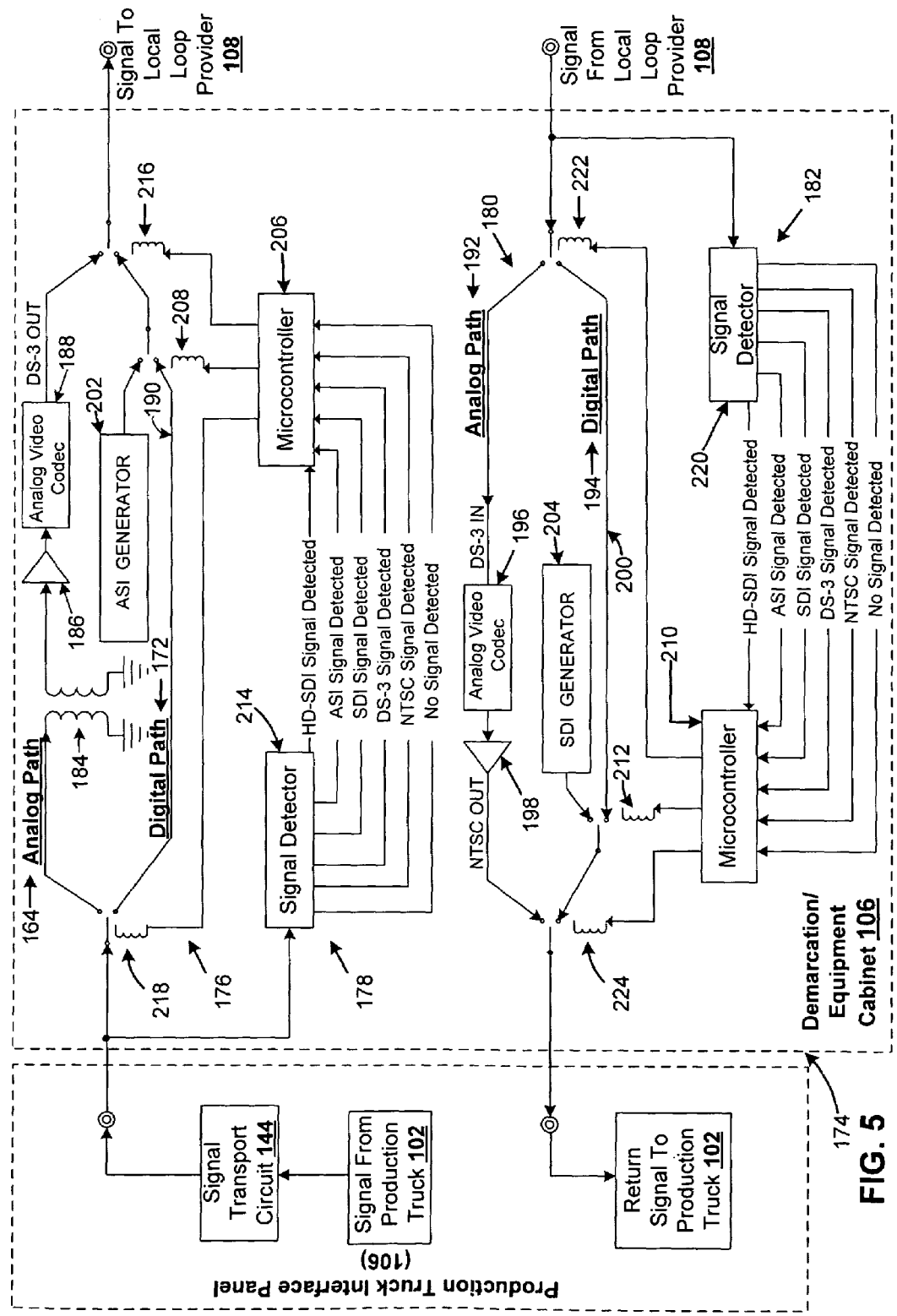
FIG. 5 shows a functional block diagram of a transmission relay circuit of the production truck interface panel of FIG. 2.

FIG. 5 shows the demarcation/equipment cabinet 106 includes a transmission relay circuit 174. The transmission relay circuit 174 preferably includes four signal processing circuits, such as 176 (one shown), accompanied by four broadcast signal sensing and discerning circuits, such as 178 (one shown). In a preferred embodiment, the transmission relay circuit 174 is preferably configured for servicing signals received from the production truck interface panel 104, and for forwarding those processed signals onto the local loop provider 108.

The transmission relay circuit 174 preferably further includes four return signal processing circuits, such as 180 (one shown), accompanied by four return signal sensing and discerning circuits such as 182 (one shown). The return signal processing circuit 180, and the return sensing and discerning circuits 182 are preferably provided, for servicing signals received from the local loop provider 108, which are processed, and forwarded to the production truck interface panel 104 for delivery to the production truck 102.

In a preferred embodiment the signal processing circuits 176 includes the analog path 164 and the digital path 172. The analog path 164 is preferably configured for processing NTSC analog video signals, and the digital path 172 is preferably configured for processing digital video signals, such as ASI digital video signals, and DS-3, SDI, and HD-SDI video transport signals. For processing NTSC analog video signals, the analog path 164 preferably includes at least an analog video isolation transformer 184, a video distribution amplifier 186, and an analog video codec 188. The analog video codec 188 outputs a DS-3 analog video transport signal, which is provided to the local loop provider 108. For processing ASI digital video signals; and DS-3, SDI, and HD-SDI digital video transport signals, the digital path 172 preferably includes a conductive path 190 that bypasses the analog path 164 to pass the signal received from signal transport circuit 144 to the local loop provider 108.

In a preferred embodiment the return signal processing circuit 180 includes the analog path 192 and the digital path 194. The analog path 192 is preferably configured for processing DS-3 digital video signals received from the local loop provider 108, and converting the received DS-3 digital video signals into NTSC analog video signals for delivery to the production truck interface panel 104, and onto the production truck 102. The digital path 194 is preferably configured for digital video signals, such as ASI digital video signals; and DS-3, SDI, and HD-SDI digital video transport signals. For processing DS-3 digital video signals, the analog path 192 preferably includes at least an analog video codec 196, and a video distribution amplifier 198. The analog video codec 196 receives DS-3 analog video transport signal and provides NTSC analog video signals. For processing ASI digital video signals; and DS-3, SDI, and HD-SDI digital video transport signals received from the local loop provider 108, the digital path 194 preferably includes a conductive path 200 that bypasses the analog path 192 to pass the signal received from the local loop provider 108, to the signal transport circuit 144, and onto the production truck 102.

FIG. 5 further shows the signal processing circuits 176 preferably further includes an ASI digital video signal generator 202, and the return signal processing circuit 180 preferably further includes a SDI digital video transport signal generator 204. In either case, the signal generators are left in a signal generating mode as long as power is supplied to the transmission relay circuit 174, and are utilized for system testing purposes.

To operate the ASI digital video signal generator 202, a microcontroller 206 of the signal sensing and discerning circuit 178 activates a relay 208, which in a preferred embodiment is a failsafe relay, that is a relay the returns to a known state in response to a loss of power. To operate the SDI digital video transport signal generator 204, a microcontroller 210 of the return signal sensing and discerning circuit 182 activates a relay 212, which in a preferred embodiment is also a failsafe relay. Activation of either the ASI digital video signal generator 202, or the SDI digital video transport signal generator 204 causes a corresponding test signal to be injected into the broadcast network 100 (of FIG. 1).

Figure 6:
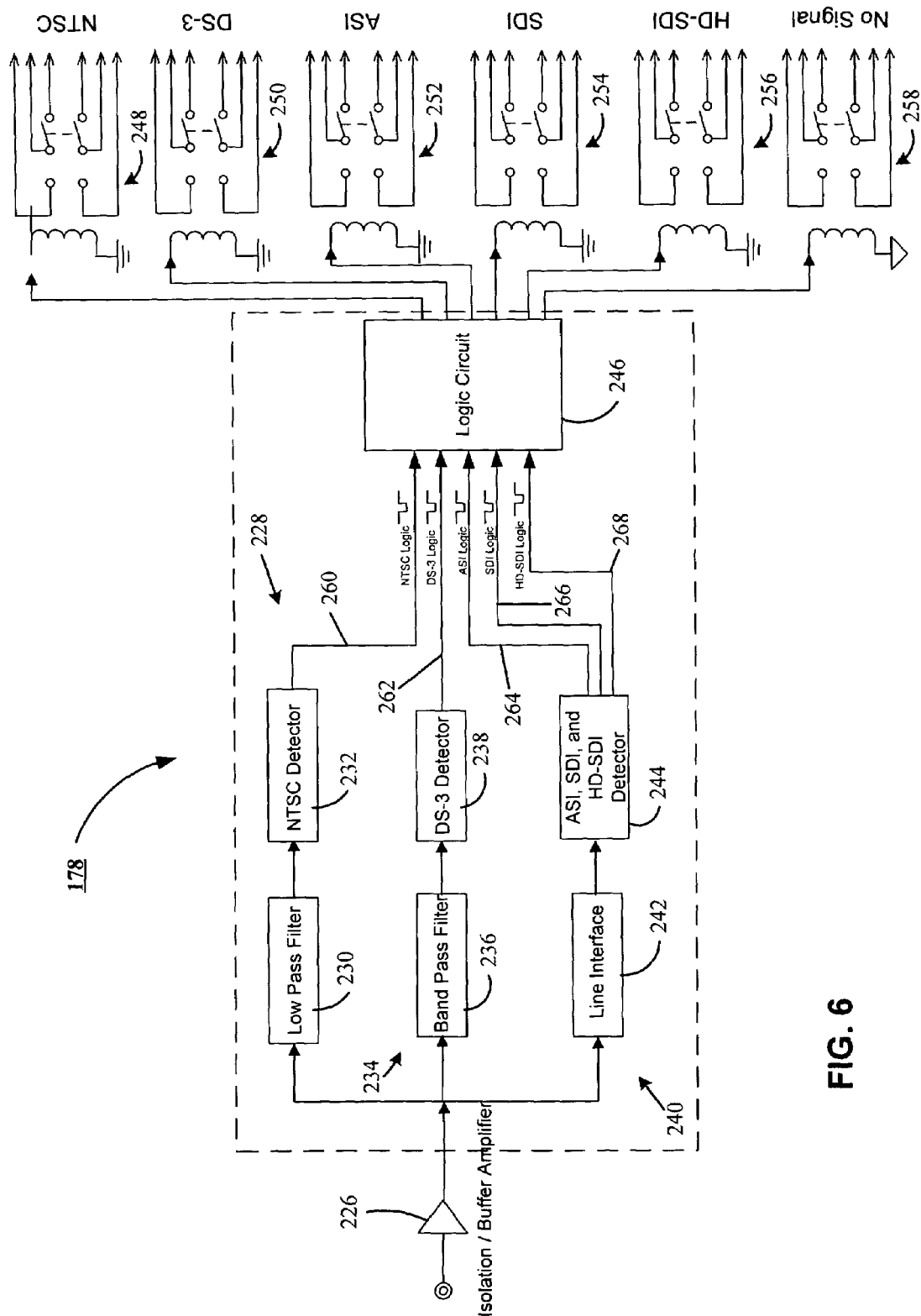
FIG. 6 shows a functional block diagram of a signal sensing and discerning circuit of the transmission relay circuit of FIG. 5.

In addition to the microcontroller 206, the signal sensing and discerning circuit 178 further includes a signal detector 214, which will be covered in greater detail during the discussion of FIG. 6. In a preferred embodiment, the signal detector 214 is configured to determine what type of broadcast signal is being provided by the production truck 102. Upon determining which type of signal is being provided by the production truck 102, the signal detector 214 provides that information to the microcontroller 206.

Based on the signal type determined by the signal detector 214, the microcontroller 206 activates relays 216 and 218, which in a preferred embodiment are latching relays, i.e. relays that remain in the state in which they were last placed. Activation of relays 216 and 218 switches in the analog path 164 when the determined signal is an analog type video signal, and switches in digital path 172 when the determined signal is a digital video type signal.

In addition to the microcontroller 210, the signal sensing and discerning circuit 182 further includes a signal detector 220, which will be covered in greater detail during the discussion of FIG. 6. In a preferred embodiment, the signal detector 214 is configured to determine what type of broadcast signal is being provided by the local loop provider 108. Upon determining which type of signal is being provided by the local loop provider 108, the signal detector 220 provides that information to the microcontroller 210.

Based on the signal type determined by the signal detector 220, the microcontroller 206 activates relays 222 and 224, which in a preferred embodiment are latching relays. Activation of relays 222 and 224 switches in the analog path 164 when the determined signal is DS-3 digital video transport signal, and switches in digital path 194 when the determined signal is an ASI digital signal, a SDI digital video transport signal, or a HD-SDI digital video transport signal.

FIG. 6 shows the signal sensing and discerning circuit 178 includes an isolation/buffer amplifier 226, which is selected to appear as a high impedance device to the signal received from the production truck 102 (of FIG. 1). The isolation/buffer amplifier 226 passes the signal received from the production truck 102 to: a NTSC signal analysis circuit 228, which includes a low bypass filter 230 and a NTSC signal detector 232; a DS-3 signal analysis circuit 234, which includes a band pass filter 236, and a DS-3 signal detector 238; and a combination ASI, SDI, and HD-SDI signal analysis circuit 240, which includes a line interface 242, and a combination ASI, SDI, and HD-SDI signal detector 244.

The signal sensing and discerning circuit 178 further includes the logic circuit 246. The logic circuit 246 works in conjunction with the NTSC signal analysis circuit 228, the DS-3 signal analysis circuit 234; and the a combination ASI, SDI, and HD-SDI signal analysis circuit 240 to determine the type of signal that is being received from the production truck 102.

The logic circuit 246 provides an output signal to a NTSC relay 248 reporting the presence of a NTSC analog video signal type of broadcast signal when the logic circuit 246 receives a signal from the NTSC signal analysis circuit 228, and no signals from the DS-3 signal analysis circuit 234, or the combination ASI, SDI, and HD-SDI signal analysis circuit 240.

The logic circuit 246 provides an output signal to a DS-3 relay 250 reporting the presence of a DS-3 digital video transport signal type of broadcast signal when the logic circuit 246 receives a signal from the DS-3 signal analysis circuit 234, and no signals from the NTSC signal analysis circuit 228, or the combination ASI, SDI, and HD-SDI signal analysis circuit 240.

The logic circuit 246 provides an output signal to an ASI relay 252 reporting the presence of an ASI digital video signal type of broadcast signal when the logic circuit 246 receives an ASI signal from the combination ASI, SDI, and HD-SDI signal analysis circuit 240, and no signal from the NTSC signal analysis circuit 228, or the DS-3 signal analysis circuit 234.

The logic circuit 246 provides an output signal to a SDI relay 254 reporting the presence of a SDI digital video transport signal type of broadcast signal when the logic circuit 246 receives an SDI signal from the combination ASI, SDI, and HD-SDI signal analysis circuit 240, and no signal from the NTSC signal analysis circuit 228, or the DS-3 signal analysis circuit 234.

The logic circuit 246 provides an output signal to a HD-SDI relay 256 reporting the presence of a HD-SDI digital video transport signal type of broadcast signal when the logic circuit 246 receives an HD-SDI signal from the combination ASI, SDI, and HD-SDI signal analysis circuit 240, and no signal from the NTSC signal analysis circuit 228, or the DS-3 signal analysis circuit 234.

The logic circuit 246 provides an output signal to a no signal relay 258 reporting no signal present if no signals are present from the NTSC signal analysis circuit 228, the DS-3 signal analysis circuit 234, or the combination ASI, SDI, and HD-SDI signal analysis circuit 240. The logic circuit 246 further provide an output signal to the no signal relay 258 reporting no signal present if a signal is present on any two or more of the NTSC signal analysis circuit 228, the DS-3 signal analysis circuit 234, and the combination ASI, SDI, and HD-SDI signal analysis circuit 240.

FIG. 6 further shows: the NTSC signal detector 232 provides a NTSC status line 260 for providing a status signal to the logic circuit 246, when a NTSC analog video signal is detected; the DS-3 signal detector 238 provides a DS-3 status line 262 for providing a status signal to the logic circuit 246, when a DS-3 digital video transport signal is detected; and a combination ASI, SDI, and HD-SDI provides an ASI status line 264 for providing a status signal to the logic circuit 246, when an ASI digital video signal is detected, and a SDI status line 266 for providing a status signal to the logic circuit 246, when a SDI digital transport signal is detected, and a HD-SDI status line 266 for providing a status signal to the logic circuit 246, when a HD-SDI digital transport signal is detected.

Figure 7:
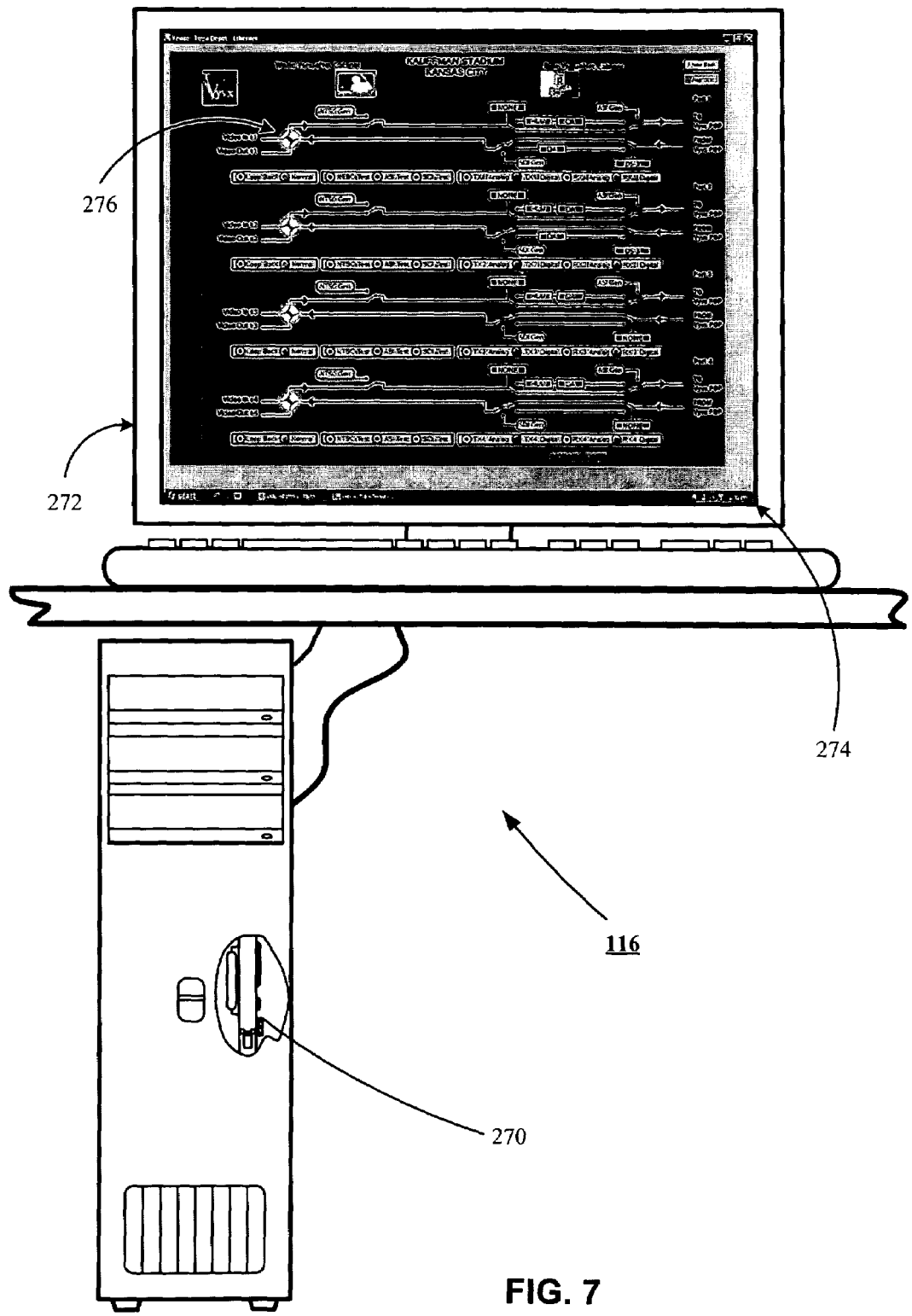
FIG. 7 illustrates a partial cutaway front elevation view of a operations control station of the present invention.

The operations control station 116 shown by FIG. 7 preferably includes a microprocessor 270 communicating with the transmission relay circuit 174 (of FIG. 5), configuration control software (not shown separately) loaded on the microprocessor 270, a display 272 responsive to the microprocessor 270, in a graphical user interface 274 provided by the configuration control software and displayed on the display 272. The graphical user interface 274 provides a relay symbol 276, which when clicked or activated by a user provides an input to the configuration control software, to issue a command to the transmission relay circuit 174 to switch the signal processing circuit 176 (of FIG. 5) to a configuration consistent with the type of broadcast signal determined by the signal sensing and discerning circuit 178.

Figure 8:
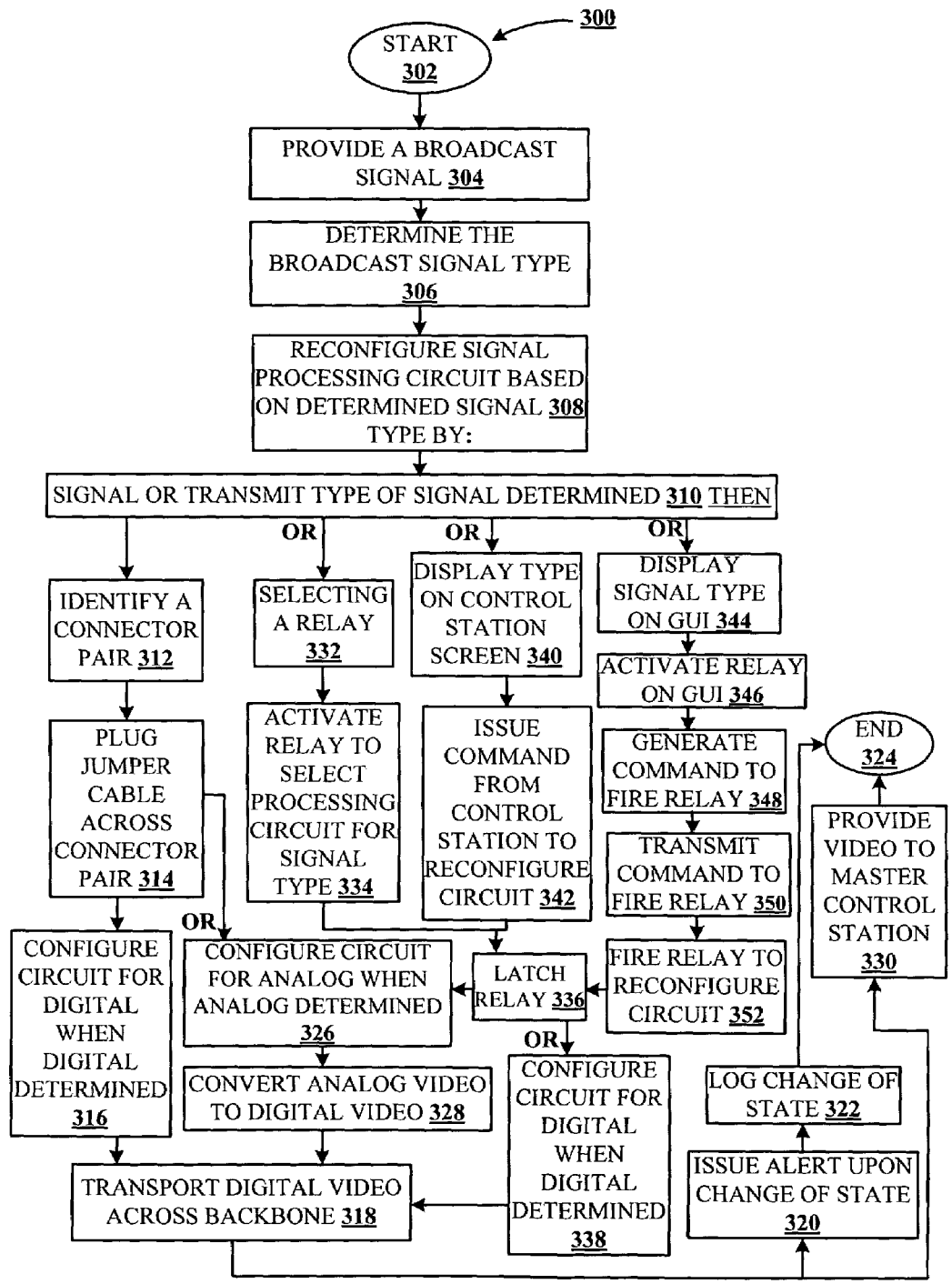
FIG. 8 illustrates a flow diagram of a method of using the present invention.

Turning to FIG. 8, shown therein is a flow chart 300, which depicts a method for broadcasting a signal over a broadcast network (such as 100). The method commences at start process step 302, and proceeds to process step 304, with providing a broadcast to a signal transmission relay circuit (such as 174), of a demarcation/equipment cabinet (such as 106). At process step 306, the type of broadcast signal provided is determined by a signal sensing and discerning circuit (such as 178), and at process step 308, a signal processing circuit (such as 176) is reconfigured when the configuration of the signal processing circuit does not support transmission of the determined broadcast signal type.

At process step 310, the signal sensing and discerning circuit signals, or transmits a signal identifying the type of broadcast determined by the signal sensing and discerning circuit. Following process step 310, the process proceeds with process step 312. At process step 312, a pair of connectors (such as 160 and 162) of the signal processing circuit that service the determined type of broadcast signal are identified, and at process step 314, a jumper cable (such as 158) is plugged across the pair of identifying connectors to switch in the processing circuit associated with the identified that broadcast signal.

At process step 316, the signal processing circuit is configured for processing a digital signal when the broadcast signal is determined to be a digital signal. At process step 318, the digital signal is transported across the backbone of an information network (such as 112). At process step 320, an alert is issued to an operations control station (such as 116), and/or to a microcontroller (such as 206) when a change in state of the transmission relay circuit is detected. At process step 322, the change in state is logged in a memory of the operations control station, and/or the microcontroller, and the process concludes at end process step 324.

Alternatively, following process step 314, the process proceeds to process step 326. At process step 326, the processing circuit is configured for processing an analog video signal when the broadcast signal type is determined to be an analog video signal. At process step 328, the provided analog video signal is converted to a digital video transport signal, and passed to the backbone of the information network at process step 318. Following process step 318, the digital video transport signal is provided by the backbone of the information network to a master control station (such as 120) at process step 330, and the process concludes at end process step 324.

Alternatively, following process step 310, the process proceeds to process step 332. At process step 332, a relay (such as 218) is selected for use in configuring the signal processing circuit. At process step 334, a relay is activated to connect the provided broadcast signal to the signal processing circuit configured for processing the determined broadcast signal type.

At process step 336, the activated relay is latched in the process and proceeds to process step 326. At process step 326, the processing circuit is configured for processing an analog video signal when the broadcast signal type is determined to be an analog video signal. At process step 328, the provided analog video signal is converted to a digital video transport signal, and passed to the backbone of the information network at process step 318. Following process step 318, the digital video transport signal is provided by the backbone of the information network to the master control station at process step 330, and the process concludes at end process step 324.

Alternatively, following latching relay process step 336, the process proceeds to process step 338, where the processing circuit is configured for processing digital video signals in a received broadcast signals are determined to be digital video signals. Following process step 338, the digital video signals are passed to the backbone of the information network at process step 318. At process step 330, the digital video signals are provided to the master control station at process step 330, and the process concludes at end process step 324.

Alternatively, following process step 310, the process proceeds to process step 340. At process step 340, the type of broadcast signal determined is displayed on a display (such as 272), of an operations control station (such as 116). At process step 342, the operations control station issues a command to the transmission relay circuit to configure the processing circuit in accordance with the signal type displayed on the display, and the process proceeds to process step 336.

At process step 336, the activated relay is latched in the process and proceeds to process step 326. At process step 326, the processing circuit is configured for processing an analog video signal when the broadcast signal type is determined to be an analog video signal. At process step 328, the provided analog video signal is converted to a digital video transport signal, and passed to the backbone of the information network at process step 318. Following process step 318, the digital video transport signal is provided by the backbone of the information network to the master control station at process step 330, and the process concludes at end process step 324.

Alternatively, following latching relay process step 336, the process proceeds to process step 338, where the processing circuit is configured for processing digital video signals in a received broadcast signals are determined to be digital video signals. Following process step 338, the digital video signals are passed to the backbone of the information network at process step 318. At process step 330, the digital video signals are provided to the master control station at process step 330, and the process concludes at end process step 324.

Alternatively, following process step 310, the process proceeds to process step 344. At process step 344, the type of broadcast signal determined is displayed on a graphical user interface (GUI) (such as 277), of the operations control station. At process step 346, a symbol of a relay (such as 276) is activated on the GUI, and the operations control station generates a command to fire the relay (such as relay 216, and/or relay 218) at process step 348. At process step 350, the operations control station transmits the command to fire the relay to the transmission relay circuit. At process step 352, the microcontroller of the sensing and discerning circuit fires the relay to reconfigure the signal processing circuit, and the process proceeds to process step 336.

At process step 336, the activated relay is latched in the process and proceeds to process step 326. At process step 326, the processing circuit is configured for processing an analog video signal when the broadcast signal type is determined to be an analog video signal. At process step 328, the provided analog video signal is converted to a digital video transport signal, and passed to the backbone of the information network at process step 318. Following process step 318, the digital video transport signal is provided by the backbone of the information network to the master control station at process step 330, and the process concludes at end process step 324.

Alternatively, following latching relay process step 336, the process proceeds to process step 338, where the processing circuit is configured for processing digital video signals in a received broadcast signals are determined to be digital video signals. Following process step 338, the digital video signals are passed to the backbone of the information network at process step 318. At process step 330, the digital video signals are provided to the master control station at process step 330, an the process concludes at end process step 324.

Figure 9:
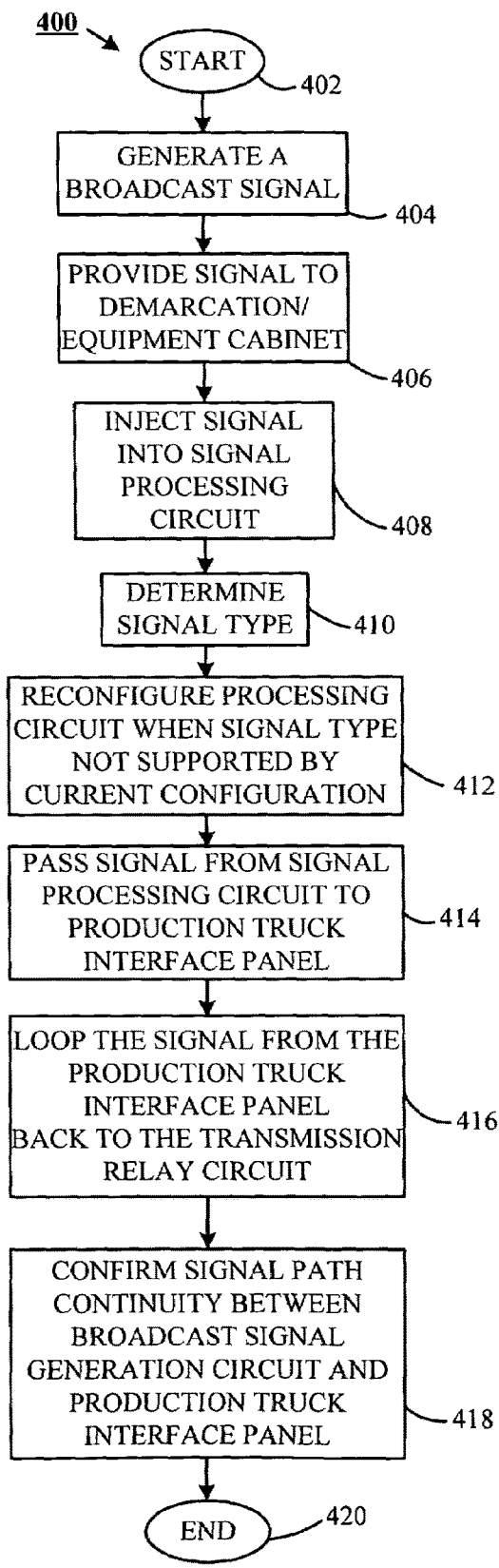
FIG. 9 illustrates a flow diagram of an alternate method of using the present invention.

Turning now to FIG. 9, shown therein is a flow chart 400, which depicts a method for confirming continuity between the demarcation/equipment cabinet broadcasting and a production truck interface panel (such as 104). The method commences at start process step 402, and proceeds to process step 404, with generating a broadcast signal with a broadcast signal generator (such as NTSC test signal generator 148). At process step 406, the generated signal is provided to the demarcation/equipment cabinet. At process step 408, the signal is injected into the signal processing circuit (176) and the signal sensing and discerning circuit (178). At process step 410, the signal type of the injected signal is determined, and the process proceeds to process step 412.

At process step 412, the processing circuit is reconfigured, when determined signal type is not supported by the current configuration of the processing circuit. At process step 414, the generated broadcast signal is passed from the signal processing circuit to the production truck interface panel. At process step 416, the broadcast signal is looped from the production truck interface panel back to the transmission relay circuit. At process step 418, the continuity between the demarcation/equipment cabinet broadcasting and a production truck interface panel is confirmed, and the process concludes at end process step 420.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed by the appended claims.

The invention claimed is:

1. A method for airing a broadcast signal over a broadcast network comprising:
   receiving a broadcast signal at a transmission relay circuit of a demarcation/equipment cabinet;
   determining the broadcast signal type with a broadcast signal sensing and discerning circuit of the transmission relay circuit;
   reconfiguring a signal processing circuit of the transmission relay circuit when the configuration of the signal processing circuit does not support transmission of the determined broadcast signal type;
   generating the received broadcast signal with a broadcast signal generation circuit of the transmission relay circuit;
   injecting the generated broadcast signal into the signal processing circuit;
   passing the generated broadcast signal from the signal processing circuit to an interface panel communicatively coupled with the broadcast signal generation circuit;
   looping the generated broadcast signal from the interface panel to the transmission relay circuit; and
   confirming signal path continuity between the transmission relay circuit and the interface panel.

2. The broadcast signal airing method of claim 1, wherein reconfiguring the signal processing circuit comprises:
   signaling the determined broadcast signal type; and
   identifying a pair of connectors of the signal processing circuit that service the determined broadcast signal type.

3. The broadcast signal airing method of claim 2, wherein reconfiguring the signal processing circuit comprises:
   using a jumper cable with the pair of signal processing circuit connectors that serve the determined broadcast signal type.

4. The broadcast signal airing method of claim 1, wherein reconfiguring the signal processing circuit comprises:
   signaling the determined broadcast signal type;
   selecting a relay, wherein the relay is communicatively coupled with the signal processing circuit configured for processing the determined broadcast signal type; and
   activating the relay to connect the received broadcast signal to the signal processing circuit configured for processing the determined broadcast signal type.

5. The broadcast signal airing method of claim 4, wherein reconfiguring the signal processing circuit comprises:
   issuing one or more alerts when a change of state of the transmission relay circuit is detected; and
   logging detected changes of state of the transmission relay circuit.

6. The broadcast signal airing method of claim 1, further comprising:
   transmitting the determined broadcast signal type across a communications network to an operations control station; and
   displaying, in a graphical user interface of the operations control station, the determined broadcast signal type.

7. The broadcast signal airing method of claim 6, further comprising:
   issuing a command from the operations control station to the demarcation/equipment cabinet to reconfigure the signal processing circuit when the configuration of the signal processing circuit does not support the displayed determined broadcast signal type.

8. The broadcast signal airing method of claim 1, further comprising:
   configuring the signal processing circuit into an analog processing path when the determined broadcast signal type is an analog video signal;
   producing a digital video transport signal from the analog video signal with the analog processing path of the signal processing circuit; and
   transferring the digital video transport signal across a backbone of a communications network.

9. The broadcast signal airing method of claim 1, further comprising:
   transmitting a signal to an operations control station signifying the determined broadcast signal type; and
   based on the transmitted signal, displaying the determined broadcast signal type in a graphical user interface of the operations control station.

10. The broadcast signal airing method of claim 9, further comprising:
    determining whether a relay symbol provided by the graphical user interface has been activated;
    if the relay symbol has been activated, generating a relay activation command; and
    transmitting the relay activation command to the demarcation/equipment cabinet.

11. The broadcast signal airing method of claim 10, further comprising:
    configuring the signal processing circuit to support processing of the determined broadcast signal type.

12. The broadcast signal airing method of claim 1, wherein the type of broadcast signal determined comprises a NTSC analog video signal.

13. The broadcast signal airing method of claim 1, wherein the type of broadcast signal determined comprises a DS-3 digital video transport signal.

14. The broadcast signal airing method of claim 1, wherein the type of broadcast signal determined comprises an ASI digital video signal.

15. The broadcast signal airing method of claim 1, wherein the type of broadcast signal determined comprises a signal selected from a group consisting of: SDI and HD-SDI digital video transport signals with embedded audio signals.

16. A method for airing a broadcast signal over a broadcast network comprising:
- receiving a broadcast signal at a transmission relay circuit of a demarcation/equipment cabinet;
- determining the broadcast signal type with a broadcast signal sensing and discerning circuit of the transmission relay circuit;
- reconfiguring a signal processing circuit of the transmission relay circuit when the configuration of the signal processing circuit does not support transmission of the determined broadcast signal type;
- transmitting a signal to an operations control station signifying the determined broadcast signal type;
- based on the transmitted signal, displaying the determined broadcast signal type in a graphical user interface of the operations control station;
- determining whether a relay symbol provided by the graphical user interface has been activated;
- if the relay symbol has been activated, generating a relay activation command; and transmitting the relay activation command to the demarcation/equipment cabinet.

17. The broadcast signal airing method of claim 16, further comprising:
- configuring the signal processing circuit to support processing of the determined broadcast signal type.

18. The broadcast signal airing method of claim 16, wherein the type of broadcast signal determined comprises a NTSC analog video signal.

19. The broadcast signal airing method of claim 16, wherein the type of broadcast signal determined comprises a DS-3 digital video transport signal.

20. The broadcast signal airing method of claim 16, wherein the type of broadcast signal determined comprises a signal selected from a group consisting of: SDI and HD-SDI digital video transport signals with embedded audio signals.

\* \* \* \* \*